United States Patent [19]

Geiger

[11] Patent Number: 5,420,828

[45] Date of Patent: May 30, 1995

[54] VIEWING SCREEN ASSEMBLY

[76] Inventor: Michael B. Geiger, 1403 76th St., Houston, Tex. 77012

[21] Appl. No.: 93,532

[22] Filed: Aug. 27, 1993

Related U.S. Application Data

[63] Continuation-in-part of Ser. No. 904,378, Jun. 25, 1992, abandoned.

[51] Int. Cl.$^6$ ............................................. H04B 11/00
[52] U.S. Cl. ........................................ 367/131; 367/7
[58] Field of Search ................... 367/107, 131, 7, 910; 348/53, 115

[56] References Cited

U.S. PATENT DOCUMENTS

| | | | |
|---|---|---|---|
| 4,028,725 | 6/1977 | Lewis | 348/115 |
| 4,449,787 | 5/1984 | Burbo et al. | 350/538 |
| 5,079,753 | 1/1992 | Suggs | 367/910 |
| 5,123,726 | 6/1992 | Webster | 348/53 |

FOREIGN PATENT DOCUMENTS

WO9115781 10/1991 Finland .

*Primary Examiner*—Daniel T. Pihulic
*Attorney, Agent, or Firm*—Kenneth A. Roddy

[57] ABSTRACT

A viewing screen apparatus for helmets or face masks of the type having a viewing area covered by a face plate is disclosed. The apparatus includes an enclosure adapted to be mounted on a helmet or face mask adjacent the face plate, a solid-state flat panel display screen and associated circuitry contained within the sealed enclosure for displaying visual images on the screen responsive to electronic signals, and a signal receiver connected with the screen for enabling the screen to receive electronic signals from an electronic signal transmission source. In one embodiment the enclosure is selectively movable between a viewing position adjacent the face plate and a position out of the wearer's field of vision to allow an unobstructed field of vision through the face plate. In another embodiment the apparatus includes an imaging device adapted to be connected to the helmet or face mask for transmitting electronic signals selected from the group consisting of analog, digital, television, and laser imaging signals to a remote location. The apparatus may be incorporated into various types of helmets and face masks such as underwater diver's helmets and masks, space suit helmets, fire fighters helmets and masks, etc., and allows the wearer to view drawings, text and other information transmitted from a remote source while carrying out tasks in an adverse environment and also allows two way visual communication between two or more persons wearing helmets or masks equipped with the viewing system.

30 Claims, 4 Drawing Sheets

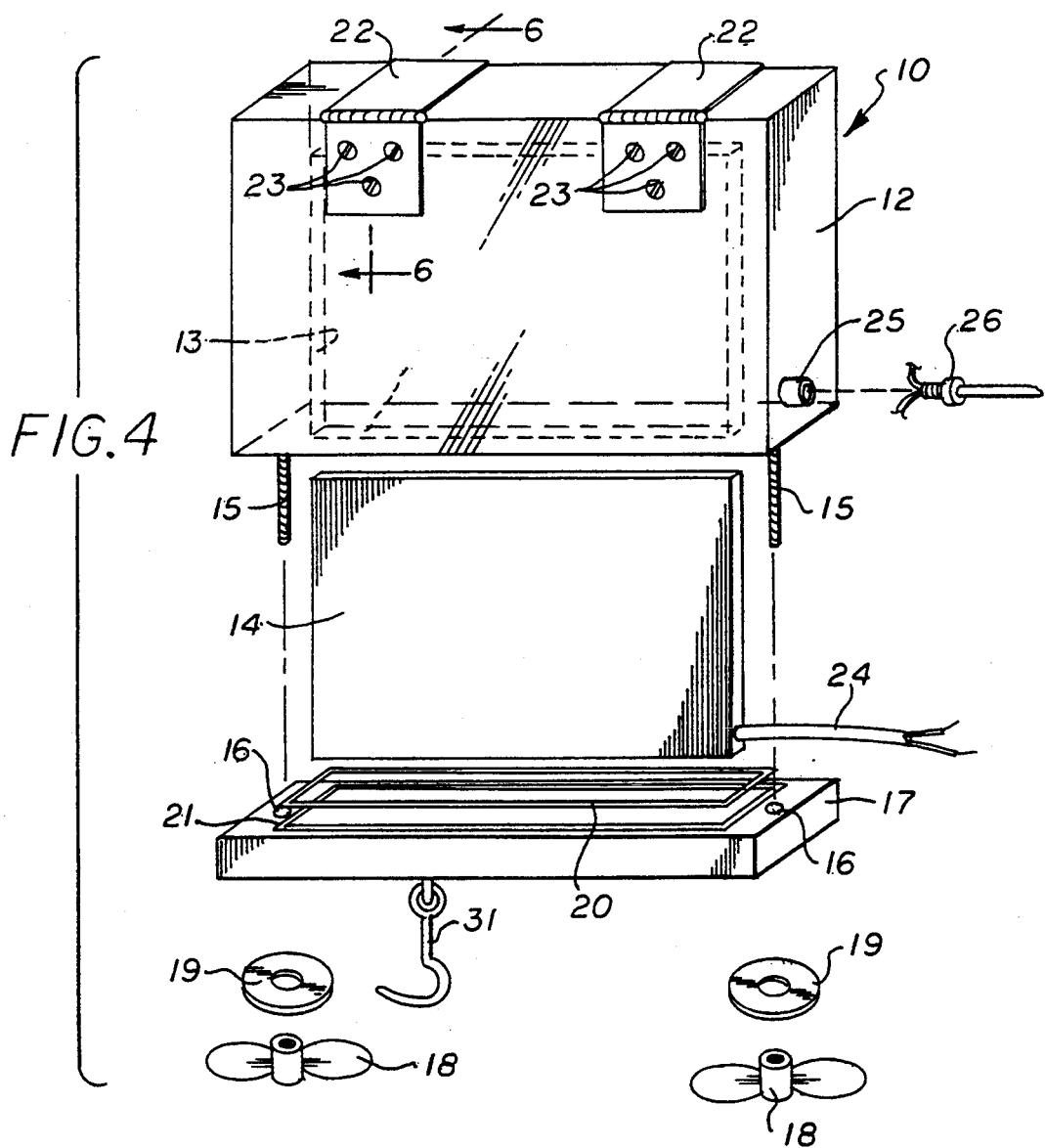
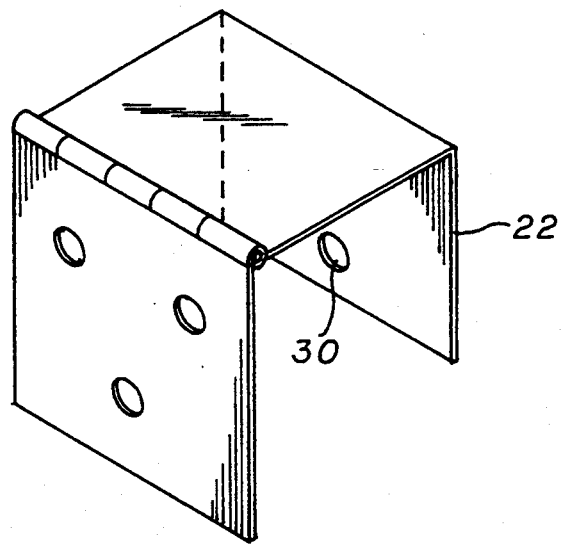

VIEWING SCREEN ASSEMBLY

CROSS-REFERENCE TO RELATED APPLICATION

This application is a Continuation-In-Part of U.S. patent application Ser. No. 07/904,378, filed Jun. 25, 1993, now abandoned.

BACKGROUND OF THE INVENTION

1. Field of the Invention

This invention relates generally to viewing screen assemblies, and more particularly to a viewing screen assembly particularly adapted to be mounted on a helmet for visual communication in adverse environments.

2. Brief Description of the Prior Art

Heretofore, the most common underwater communication systems between an underwater diver and his helpers or supervisors topside have been audio communication systems. Traditionally, underwater divers dispatched to perform underwater tasks wear "hard hat" type helmets to protect themselves from injury underwater, to facilitate underwater audio communications, and to maintain comfort for long periods underwater. This type of communication has proven to facilitate increased safety and quality of work performed by divers than without it. More recently, scuba divers using self contained diving equipment with no direct link to the surface by means of an air hose, communications wire, or other line, have been offered FM wireless audio communications.

However, audio communications have some disadvantages. Helmeted divers have long depended upon visual inspections of the actual underwater conditions to determine the scope and methodology of the underwater tasks to be accomplished prior to going to work. Often, in discussions of the actual conditions with topside supervisors, the diver will be given a verbal explanation of the tasks to be accomplished while he is at the worksite underwater. Many times the diver does not get a clear understanding of what and how the topside personnel want him or her to do the task. This is due largely in part to the fact that the diver does not have direct visual contact with these personnel. If a diver is more than ten meters underwater and is required to come to the surface to look at blueprints or other visual information, he or she must go through a time consuming, decompression period in the water first. In some instances, a diver may desire to refer to blueprints, drawings, text, or other visual information during a dive, but because of time restraints, will complete the task at hand without viewing the proper reference materials.

Recent advancements in underwater audio communications have compounded this problem for scuba divers, because the scuba mode of diving is time limited, in that the scuba diver has a finite length of time to accomplish a task before running out of air. This is opposed to a helmeted diver's unlimited air supply which is delivered via an air hose from the surface.

In the past, the solution to this problem has been to make multiple dives, sometimes using two or more divers. The first diver inspects the job site, goes through the lengthy decompression process, then is brought to the surface. After a discussion with the topside engineers and diving supervisors, a second diver is dispatched to complete the task at hand. In circumstances where the diver found it necessary or advantageous to verify or consult plans, drawings, or to have a face to face discussion with topside personnel while at the work site, the diver would have to decompress and come to the surface first, or risk comprising his or her personal safety by attempting to complete the task without adequate planning. These methods suffer from inherent disadvantages. They are costly, time consuming, and may increase the risk of injury to the diver if not followed to the letter.

There is clearly a need in underwater diving for a means of communicating visual information to the diver while he or she is underwater to facilitate the diver's task accomplishment. Most advancements in underwater visual communication, such as television cameras, have focused on conveying an image of the underwater environment to the topside personnel, not in displaying an image of the topside environment to the diver. Divers who need to refer to information while underwater have not been considered in the evolvement of underwater visual information transmission.

Some development has been made in underwater structural inspection and testing using a hand-held television monitor (CRT) for ultrasonic non-destructive testing, such as disclosed by Sylvester, U.S. Pat. No. 4,102,203. In the Sylvester system, an ultrasonic transducer is held in one hand and a television monitor (CRT) which displays ultrasonic information is held in the other hand, and a television camera is mounted on the diver's helmet which allows topside personnel to see the diver's progress on the project.

Keeler, U.S. Pat. No. 5,091,778 discloses an imaging LIDAR system employing tunable and fixed frequency laser transmitters which enables a diver to see six to ten times further underwater than possible with the naked eye. However, the monitors used for this technology are too cumbersome and heavy to carry comfortably while swimming underwater.

Suggs, U.S. Pat. No. 5,079,753 discloses a sonar imaging system which uses sound waves and CRT (cathode ray tube) monitors to locate and display the position of a diver relative to submerged objects. An underwater sonar scanning head emits sound waves and projects an image of a top plan view of the area scanned to a monitor on the surface and to a monitor mounted on the side of the helmet of the diver. The sonar image produced on the helmet mounted monitor is viewed by the diver through a rectangular box-like "folding mirror or prism arrangement" which extends between the glass window of the helmet and the monitor. The diver's position and the position of the objects appear on the CRT screen as spots or "pips" in a field of concentric circles, similar to a radar screen. A station operator at the surface may place an X or other symbol on the pip representing the diver and the target object and produce a dashed line representing the path between them which appears on the diver's CRT screen to aid in guiding him toward the target.

Barr, U.S. Pat. No. 5,033,818 discloses an instrumentation box which is strapped to the diver's air tank and contains a timer and microprocessor that is connected to a pressure sensor in the diver's air hose for monitoring air tank pressure, depth and temperature, and elapsed time of the dive. The microprocessor is connected to a small display box mounted in the lower portion of the diver's face mask. The display box has a series of illuminated digits or symbols formed of LED's (light emitting diodes) or may comprise a LCD (liquid crystal display) illuminated by a separate light source. The digits or symbols are reflected upwardly onto an angled mirror at the top of the face mask which reflects them onto a partially reflecting mirror secured on the interior surface of the face plate. Barr merely functions as a self contained warning system wherein the diver enters dive parameters into the microprocessor and the sensors monitor these and other parameters and automatically flashes warnings through a system of mirrors if the pre-entered parameters are exceeded during a dive. The digits or symbols provide only numerical or symbolic images as to the status of the diver's air supply, water depth and elapsed time.

Heretofore, in non-fluid immersion applications, various helmet or head mounted display systems have been used. For example, there are military systems which assist pilots and combat troops in maneuvering aircraft and deploying weapons and aiming weapons without physical exposure to the enemy. These systems have also been used in night vision systems giving the user an advantage over an adversary who does not have the benefit of night vision equipment. Most of these types of systems have a sight reticle built into them and utilize a cathode ray tube (CRT) receiver or display rather than a flat panel display.

Burbo et al, U.S. Pat. No. 4,449,787 discloses a binocular imaging system for night vision which is inserted into a slot on the visor of a helmet that carries an image intensifier assembly having a first and second spaced apart tubular housing each of which contains a night vision optical system. This system has a pivot connection which allows the tubular housings to be locked in position away from the user's eyes or to be positioned in front of the user's eyes.

Copeland, U.S. Pat. No. 5,001,786 discloses a motorcycle helmet with a headlight mounted on it wherein a portion of the light from the headlight is diverted to illuminate a rotating translucent disk that gives directional heading information to the wearer.

Aileo, U.S. Pat. No. 4,231,117 discloses a helmet assembly having a rigid outer shell and an inner helmet assembly that fits closely over the wearers head which positions a portable cathode ray (CRT) display and reflector unit carried by the rigid outer shell of the helmet in a predetermined position relative to the eye of the wearer.

Hansen et al, U.S. Pat. Nos. 4,786,966 and 4,884,137 disclose a weapon mounted video camera which transmits video signals to a video display mounted on the helmet of the user using a non-visible light carrier wavelength which has a high degree of absorption in atmospheric water vapor. The image displayed is a holographic image, and in U.S. Pat. No. 4,884,137, the video display includes a sight reticle superimposed on the image of the target, so that the wearer can aim the weapon by moving it until the target object displayed by the camera is aligned with the sight reticle. This system depends upon line of sight.

In adverse non-fluid environments, such as space related environments, it is important for the technicians to have visual data available to them as a readily available reference when retrieving satellites, making repairs outside the space capsule, conducting experiments, and in building and assembling space stations and other structures in outer space. For example, in space station construction, the astronaut must have access to blueprints or other technical data while in an "extra vehicular activity" (EVA) mode, just as they would if they were doing construction on land. Astronauts are extensively trained for each specific task, and practice these tasks in simulated environments, such as water tank testing, and reduced atmosphere tanks. There is a need for a compact system for the transmission of general and technical information and the transmission of televised images to astronauts in adverse environments.

Holographic displays are commonly used in aircraft display systems. However, holographic displays suffer from the disadvantage of being viewed on a transparent background, which results in a lack of clear detail when the image is viewed while facing the sun or brightly lit objects. They also suffer from a limitation of being monochromatic, which when combined with a constantly changing background, in color and hue, makes holographic displays difficult to view when highly detailed information is presented via this format. This presents a problem when the holographic images are projected onto or through a transparent visor to be viewed while the viewer is also looking an object through the visor.

Withrington, U.S. Pat. No. 3,940,204 discloses a helmet mounted display utilizing a holographic lens with an abberated wavefront in conjunction with mirrors and prisms operating at a large off-axis angle to present a collimated virtual image of an object, such as the face of a cathode ray tube (CRT) to an observer.

A conventional space helmet developed by the National Aeronautics And Space Administration (NASA) has a thin layer of gold deposited on the outer visor for thermal radiation, which makes the interior of the helmet less transparent, but because of the lack of an atmosphere, and the extreme clarity in space, the brilliance of the lighting from the sun and other celestial bodies would be disconcerting and confusing when looking at projected images or holographic images in the space helmet. Thus, there is a need for an opaque display system suitable for use on space helmets.

Split screen images are of unrealized advantage and potential for use in adverse environments, such as underwater, outer space and smoke filled buildings. In the past, they have not been used in visual displays in helmets primarily because of size constraints of the display screens then in existence. The technology of miniaturization has only recently developed in the 1990's to the point where it was possible to produce a thin profile, solid state, lightweight, liquid crystal display screen (LCD) with a proportionally large viewing area. It is this type of screen which is incorporated in the present invention.

The present invention is distinguished over the prior art in general, and these patents in particular by a viewing screen apparatus for helmets or face masks of the type having a viewing area covered by a face plate which includes an enclosure adapted to be mounted on a helmet or face mask adjacent the face plate, a solid-state flat panel display screen and associated circuitry contained within the sealed enclosure for displaying visual images on the screen responsive to electronic signals, and a signal receiver connected with the screen for enabling the screen to receive electronic signals from an electronic signal transmission source. In one embodiment the enclosure is selectively movable between a viewing position adjacent the face plate and a position out of the wearer's field of vision to allow an unobstructed field of vision through the face plate. In another embodiment the apparatus includes an imaging device adapted to be connected to the helmet or face mask for transmitting electronic signals selected from the group consisting of analog, digital, television, and laser imaging signals to a remote location. The apparatus may be incorporated into various types of helmets and face masks such as underwater diver's helmets and masks, space suit helmets, fire fighters helmets and masks, etc., and allows the wearer to view drawings, text and other information transmitted from a remote source while carrying out tasks in an adverse environment and also allows two way visual communication between two or more persons wearing helmets or masks equipped with the viewing system.

SUMMARY OF THE INVENTION

It is therefore an object of the present invention to provide a viewing screen assembly suitable for use in helmets and face masks having a thin, solid-state flat panel viewing display.

It is another object of this invention to provide a viewing screen assembly suitable for underwater divers which may be used to transmit any type of visual information through a fluid medium to a diver underwater.

Another object of this invention is to provide a viewing screen assembly suitable for use in helmets and face masks which has a display screen sufficiently large to display a clearly discernible split screen image.

Another object of this invention is to provide a helmet or face mask for use in adverse environments for visual communication between underwater divers, fire fighters, astronauts, and other persons.

Another object of this invention is to provide a thin profile, lightweight, visual imaging device which can be incorporated into the visor or shield of a space helmet for unobstructed viewing of blueprints, drawings, text, and other visual data without interference from brilliant lighting from the sun or other celestial bodies.

A further object of this invention is to provide a thin profile, lightweight, visual imaging device which can be incorporated into the visor or shield of a space helmet and can be viewed by the astronaut while engaged in tasks which do not permit hands-free mobility A still further object of this invention is to provide a viewing screen assembly for use in helmets and face masks which is simple in construction, economical to manufacture, and reliable in operation.

Other objects of the invention will become apparent from time to time throughout the specification and claims as hereinafter related.

The above noted objects and other objects of the invention are accomplished by a viewing screen apparatus for helmets or face masks of the type having a viewing area covered by a face plate is disclosed which includes an enclosure adapted to be mounted on a helmet or face mask adjacent the face plate, a solid-state flat panel display screen and associated circuitry contained within the sealed enclosure for displaying visual images on the screen responsive to electronic signals, and a signal receiver connected with the screen for enabling the screen to receive electronic signals from an electronic signal transmission source. In one embodiment the enclosure is selectively movable between a viewing position adjacent the face plate and a position out of the wearer's field of vision to allow an unobstructed field of vision through the face plate. In another embodiment the apparatus includes an imaging device adapted to be connected to the helmet or face mask for transmitting electronic signals selected from the group consisting of analog, digital, television, and laser imaging signals to a remote location. The apparatus may be incorporated into various types of helmets and face masks such as underwater diver's helmets and masks, space suit helmets, fire fighters helmets and masks, etc., and allows the wearer to view drawings, text and other information transmitted from a remote source while carrying out tasks in an adverse environment and also allows two way visual communication between two or more persons wearing helmets or masks equipped with the viewing system.

BRIEF DESCRIPTION OF THE DRAWINGS

FIG. 3 is an exploded view of the viewing screen and waterproof enclosure of the embodiment of FIG. 1.

FIG. 4 is a perspective view of the hinge attachment of the embodiment of FIG. 1.

DESCRIPTION OF THE PREFERRED EMBODIMENTS

Figure 1:
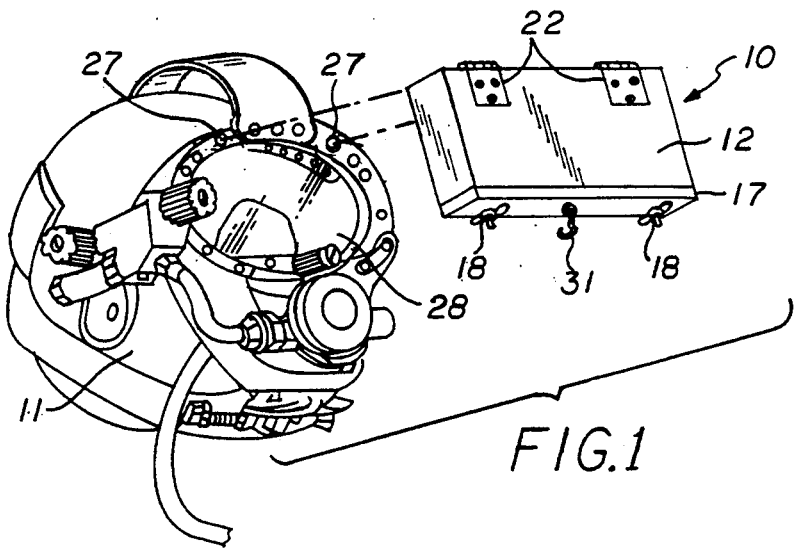
FIG. 1 is a perspective view of a diver's helmet showing a viewing screen assembly in accordance with one embodiment of the present invention being mounted thereon.
Figure 2:
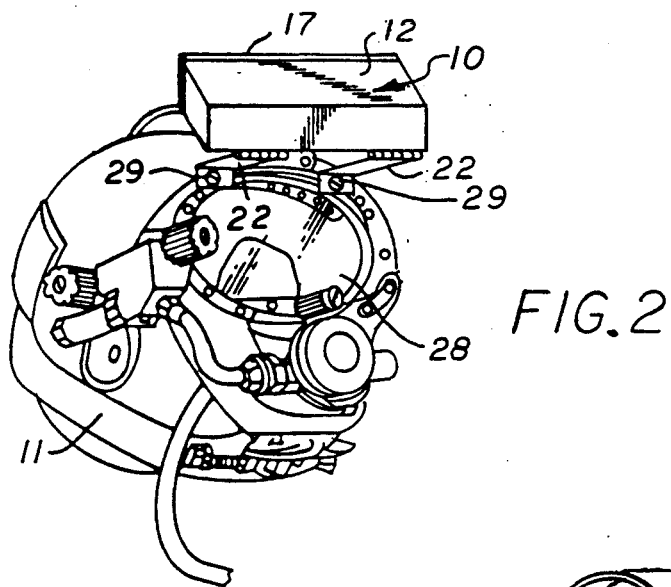
FIG. 2 is a perspective view of the diver's helmet with the viewing screen assembly mounted thereon shown with the viewing assembly in a raised position.
Figure 3:
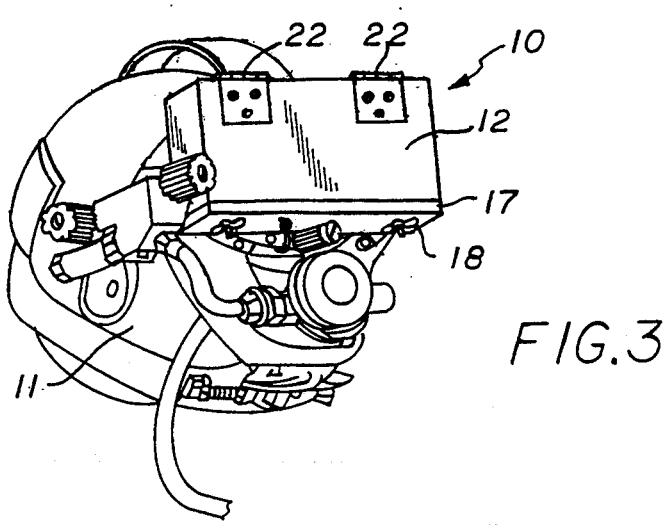
FIG. 3 is a perspective view of the diver's helmet with the viewing screen assembly mounted thereon shown with the viewing assembly in a lowered position.

Referring now to the drawings by numerals of reference, a viewing assembly 10 suitable for use underwater in accordance with the present invention is shown in FIGS. 1–6. FIG. 1 shows the viewing assembly 10 prior to connecting it to a diver's helmet 11. FIG. 2 shows the viewing assembly 10 in a raised position which allows the diver to see his immediate surrounding area and FIG. 3 shows the viewing assembly in a lowered position.

As best seen in FIG. 4, the viewing assembly 10 for underwater use comprises a generally rectangular enclosure 12 having a central cavity 13 open at one end for receiving a thin display screen 14 (described hereinafter). A pair of threaded studs 15 extend outwardly from the open end of the enclosure 12 at opposite sides of the cavity 13 to be received through holes 16 near opposite sides of a flat plate 17 which is received on the open end of the enclosure to enclose the open end of the cavity 13. The plate 17 is secured on the open end of the enclosure 12 by wing nuts 18 and washers 19 installed on the studs 15. An O-ring 20 carried in a O-ring groove 21 formed on the inward facing surface of the plate 17 surrounds the open end of the cavity 13 and forms a watertight seal on the end of the enclosure when the wing nuts 18 are tightened.

Figure 6:
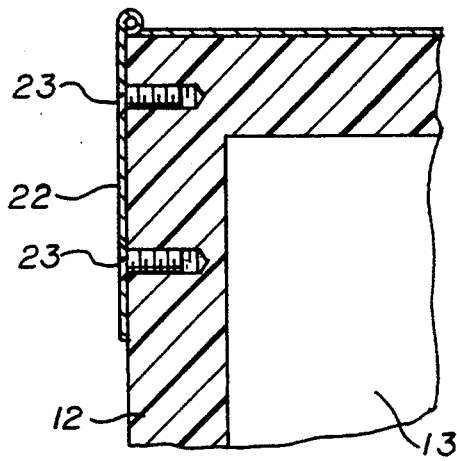
FIG. 6 is a partial cross section through the hinge and enclosure body taken along line 6—6 of FIG. 4.

The enclosure 12 is formed of suitable material, such as lexan, to withstand pressures at depths greater than 100 meters and is transparent at least in the areas overlying the viewing portion of the screen 14. A pair of U-shaped hinges 22 (FIG. 5) are secured to the exterior of the enclosure 12 by screws 23 or other suitable fastener means. FIG. 6 shows a portion of the enclosure 12 where a hinge 22 is installed. The screws 23 do not penetrate the cavity 23 of the enclosure so that watertight integrity is maintained.

Referring again to FIG. 4, the screen 14 has wires 24 which pass through a threaded recepticle 25 extending through the side wall of the enclosure 12. A waterproof electrical connector 26 is received in the recepticle 25 and surrounds the wires 24 to provide a waterproof connection between the screen 14 and the exterior of the enclosure 12. It should be understood that other types of connectors may be used to connect the display screen to a signal transmission source.

The helmet 11 is provided with mounting holes 27 adjacent the face plate 28 (FIG. 1). The enclosure 12 is pivotally mounted on the helmet 11 by screws 29 which pass through holes 30 in the outer bent leaves of the hinges 22. The side of the enclosure 12 which is to be placed adjacent the faceplate 28 may be shaped to conform to the shape of the faceplate. A hook latch 31 (FIGS. 1 and 4) is installed on the enclosure plate 17 and is received in a latch eye (not shown) installed on the helmet above and below the faceplate 28 to releasably maintain the viewing assembly 10 in the raised position (FIG. 2) and in the lowered position (FIG. 3). In the preferred embodiment, the hinges and mounting holes are located to balance the weight of the viewing assembly on the helmet, however, it should be understood that other mounting locations may be used.

Figure 7:
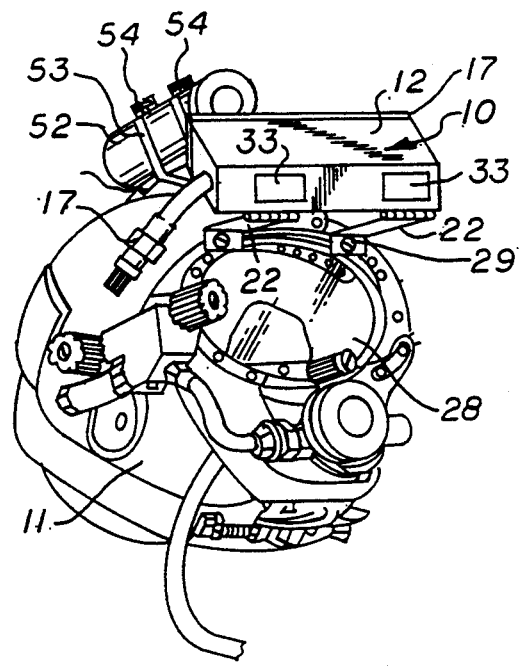
FIG. 7 is a perspective view of the embodiment of FIG. 1 shown with an underwater television camera.
Figure 8:
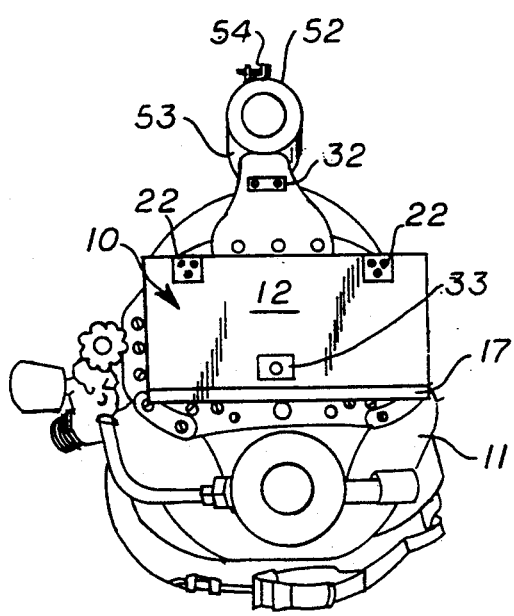
FIG. 8 is a front view of the embodiment of FIG. 1 shown in the down position with an underwater television camera.

Alternatively, as shown in FIGS. 7 and 8, the helmet 11 may be provided with a steel plate 32 above the faceplate 28 which cooperates with a magnetic fastener 33 installed on one side of the viewing assembly enclosure 12 to hold the viewing assembly 10 in the raised position (FIG. 7). A pair of magnetic fasteners 33 installed on the top surface of the enclosure 12 releasable engage the hinges 22 to hold the viewing assembly in the lowered position (FIG. 8).

As shown in FIG. 4, the screen 14 fits into the cavity 13 of the enclosure 12. The screen 14 should fit snugly, but not tightly. With certain screens (described below), other components, such as a video signal receiver, inverter, heat sink, heater, light source, power source, etc., may be connected with the screen in the enclosure 12. In the event that an inverter or heat sink is used, a portion of the enclosure 12 may be made of metal and the component secured thereto.

It should be understood that the viewing assembly 10 may be made by encasing the screen in a castable liquid plastic and then letting it harden to form the enclosure and to have other components, such as a video signal receiver, inverter, heat sink, heater, light source, power source, etc., cast into the finished enclosure as it is formed. Another method of forming the viewing assembly 10 is to heat shrink or vacuum form a plastic film around the screen and various components to form the watertight enclosure.

The present viewing assembly 10 utilizes a thin, lightweight, flat panel display screen 14 with a proportionally large viewing area which will produce visual images from various types of electronic signals including analog, digital, laser imaging, and television signals. The preferred flat panel display screen 14 is a backlit, solid state liquid crystal display screen, similar to the type recently developed for use in lap-top computers. In some underwater applications, a very low frequency (VLF) modulated radio transmission receiver may be used with the screen. Commercially available screens, such as a Sharp LQ6NC01, LQ4NC01, LM 32009P, or Hewlett Packard HP 95 LX may be suitable for use. The Sharp LQ6NC01 color screen is capable of receiving an analog, or television signal. Others, like the Sharp LM 32009P black and white screen, receives digital signals from a computer. Either type is capable of receiving information from the surface and displaying it visually to a diver. Both of these screens offer the viewer a wide field of view. The Sharp LQ6NC01 offers a display area of 87 mm by 113 mm, with outline dimensions of only 149 mm by 23 mm thick, and a weight on the order of 320 grams. The Sharp LQ4NC01 is a smaller screen, having a display area of 62 mm by 82 mm, with outline dimensions of 110 mm by 21 mm thick, and weighs only 180 grams, which readily adapts to a SCUBA diver's mask faceplate, or to a helmet visor (described hereinafter).

In the event that analog information required to be sent to a screen which will only receive digital information, a suitable commercially available converter may be incorporated.

Alternatively, the enclosure may be fixed in place inside the divers helmet. The viewing assembly may also have a guide attached to it which can lock the screen in a partially opened position, allowing the diver to see out of the helmet and at the same time, view the display on the viewing assembly. In another embodiment, the a mirror may be mounted on or in the diver's helmet to assist the diver in viewing the partially opened screen assembly, or to assist in viewing an object outside of the helmet. In still another embodiment, the hinges may have removable hinge pins or other simple means to dislodge the viewing assembly from the diver's helmet. In a further embodiment, the viewing assembly may be viewed in the use of holographic interferometric stress and deformation analysis of underwater structures and ships. The diver uses the viewing assembly to locate specific areas for repairs or visual inspections.

Figure 10:
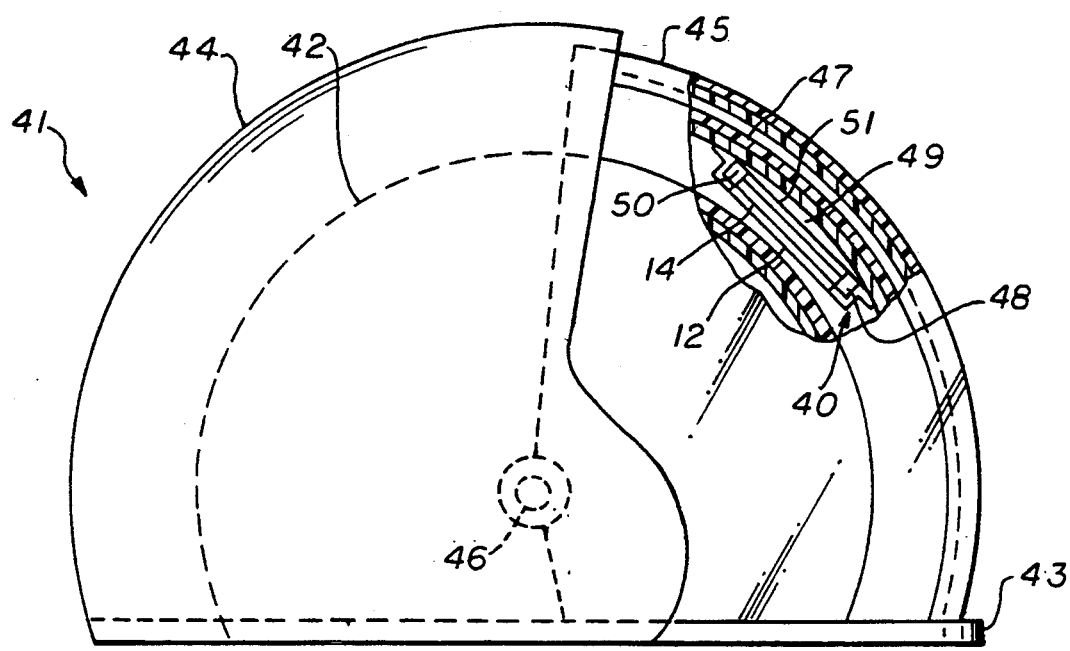
FIG. 10 is a side elevation of a space helmet having a viewing screen assembly mounted thereon in accordance with another embodiment of the present invention wherein the screen is mounted on an intermediate visor of the helmet.
Figure 9:
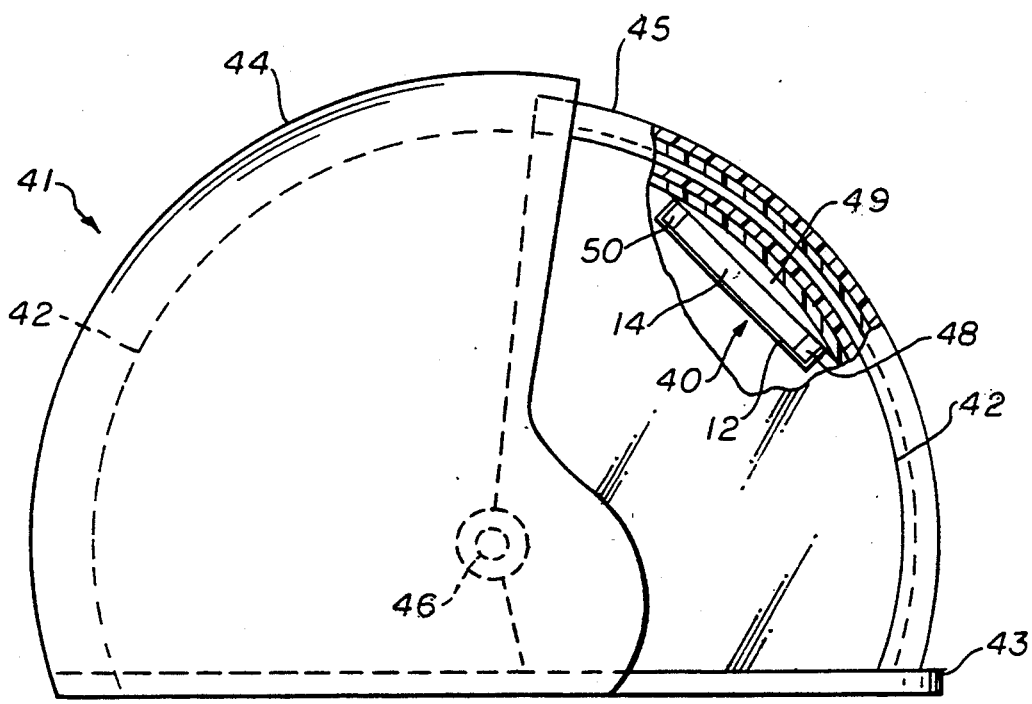
FIG. 9 is a side elevation of a space helmet having a viewing screen assembly mounted thereon in accordance with another embodiment of the present invention wherein the screen is mounted on an inner pressure shell member of the helmet.

Referring now to FIGS. 9 and 10, there is shown an alternate embodiment of the viewing assembly 40 suitable for use in non-fluid environments, such as in outer space. In the illustrated example, the helmet 41 is a space suit helmet which comprises an inner shell 42 of a truncated spherical configuration or bubble shape which is fitted at its open end with a metallic neck ring 43 suitable for sealing connection with a pressurized space suit. The front portion of the inner shell 42 is transparent and serves a transparent visor for the astronaut. The rear portion of the helmet 41 is provided with an outer shell 44. For extra vehicular activity (EVA), the helmet 41 is equipped with an outer visor 45 which is connected to the outer helmet shell 44 by pivot connections 46 on opposite sides of the helmet. The outer visor 45 pivots between a retracted raised position about the rear portion of the helmet between the shells 42 and 44 and a forward lowered position to cover the front transparent portion of the inner shell 42. The inner shell 42 and outer visor 45 are constructed of materials suitable for use in outer space, such as a polycarbonate/polysulfone laminate. In the embodiment of FIG. 9, the viewing assembly 40 is secured to the interior of the inner shell 42 in a position just above the astronauts field of vision during normal viewing to give a substantially unobstructed field of vision.

FIG. 10 shows a modification of the helmet 41 which has an intermediate visor 47 disposed between the exterior of the inner shell 42 and the interior of the outer visor 45. The intermediate visor 47 pivots between a retracted raised position about the rear portion of the helmet between the inner shell 42 and the outer visor 45 and a forward lowered position to cover the front transparent portion of the inner shell 42. The intermediate visor 47 is formed of materials suitable for use in outer space, such as a polycarbonate/polysulfone laminate. In the embodiment of FIG. 10, the viewing assembly 40 is secured to the interior of the intermediate visor 47 in a position just above the astronauts field of vision during normal viewing to give a substantially unobstructed field of vision. It should be understood that in some applications, the viewing assembly 40 may be secured to the exterior of the outer visor 45, or pivotally connected to the helmet as described in the diver's helmet example, or may be held in place between the inner shell 42 and the outer visor 45 by a wire or plastic framework, instead of the intermediate visor 47.

In the embodiments of FIGS. 9 and 10, the viewing assembly 40 utilize the same type of thin, lightweight, flat panel display screen 14, described previously, with a proportionally large viewing area which will produce visual images from various types of electronic signals including analog, digital, laser imaging, and television signals. The preferred flat panel display screen 14 is a backlit, solid state liquid crystal display screen, similar to the type recently developed for use in lap-top computers, and described in detail above.

As previously described, the screen 14 may be installed in a cavity of the enclosure 12 and may be connected with other components, such as a video signal receiver, inverter, heat sink, heater, light source, power source, etc., which may also be installed in the enclosure. The display screen 14 and associated components may also be encased in a suitable material to form the enclosure. The screen enclosure 12 is mounted to the inner shell 42 or intermediate visor 47 by adhesives, clips, or other suitable fastening means.

It has been found that spacecraft propellants and a variety of other environmental hazards may adversely affect unprotected electronics equipment which is exposed to the space environment including being struck with meteorites. Because of these factors, and the possibility of chemical contamination from space vehicle propellants during refueling, the preferred screen enclosure 12 in applications where the screen is exterior of the pressure protective inner shell 42 of the helmet, is formed of a laminate of polycarbonate polymer bonded to a layer of polysulfone. In applications where the screen enclosure 12 is attached to the interior of the pressure protective inner shell 42, the inner shell of the space helmet may serve as the outside protective enclosure for the screen 14. The screen enclosure 12, if inside the pressure protective inner shell 42, can be pressurized by the breathing medium or, if outside the shell 42, can be vented to the ambient space environment.

The screen assembly in the embodiment of FIG. 10 may be adjustably positioned by partially lifting or lowering the intermediate visor 47 to any desired level, or the intermediate visor may be fixed in place. Optionally, the intermediate visor 47 may be shortened in length so as not to extend down to the neck ring 43 of the space suit, but instead terminate at a level just below the lowest point of the screen enclosure body.

The size of the screen in the embodiment of FIG. 10 is dependent upon the screen's resolution requirements and the size of the space between the pressure protective inner shell 42 and the intermediate visor 47. This distance serves to limit the effective size which a flat panel display may take, and along with the thickness of the screen assembly, will be the final limiting factor for size constraints for the screen used. In other words, the screen assembly 40 is sized so that its outer edges will not rub on the adjacent visor 45 or the center of the screen assembly will not rub on the inner pressure shell 42 when the screen is moved in or out of the wearer's field of view. The use of a fiber optic bundle as a light source for backlighting will greatly reduce the cross sectional thickness of the screen assembly and will allow a larger screen to be used if desired.

In a preferred embodiment, the screen 14 is connected to a light source, battery pack, and heater thermostat assembly 48 and is backlighted by a fiber optic bundle 49 which is connected at one end to the light source and to the LCD screen at their other end for illuminating the screen. Alternatively, the display screen 14 may utilize a flourescent tube for backlighting, or in the absence of artificial lighting, may utilize only ambient lighting for backlighting.

A video signal receiver 50 connected with the screen 14 receives signals from a remote transmitter (not shown) which are displayed on the screen. The preferred video signal receiver 50 is a small miniature unit. The signal receiver configuration and design is based upon the type of screen chosen, the type of signal requirements for the screen, and the quantity of information to be transmitted. A simple amplitude modulated (AM) signal receiver will suffice for a monochromatic flat panel display. The video signal receiver 50 processes the received signal into a standard electrical video format. While not limited to a raster/scan type video system, such a system can easily be adapted for use with the present invention.

A video transmitter may be set up at any location remote from the screen assembly and can be either located on the space capsule, the space helmet 41, or on the space suit. The video transmitter may also be connected to a television camera on the space suit or helmet of another astronaut so that each astronaut can see what the other is doing. The video transmitter may also be located at an earth based facility to connect the astronaut directly to mission control via the video feed.

The viewing screen assembly may also be linked electronically with a computer and/or CD ROM for interactive interrogations of blueprints, drawings, text, or other information which would be helpful to the astronaut while in an extra vehicular activity (EVA) mode. With this type of working arrangement, the astronaut would be able to choose from a selection of reference material, data banks, and different methods of accomplishing the task. He or she would also have raw data at his or her disposal to use as a guide through departures from the planned assignments for whatever reasons.

The backlighting level for the screen may be automatically adjusted by a photodetector which compensates for varying light levels in the ambient environment. In circumstances where the astronaut is turning his helmet toward the sun, then away from it, or is in extra vehicular activity (EVA) modes during periods of darkness and brilliant sunlight, the ability to brighten or darken the backlighting to compensate for the lighting conditions provides an advantageous element in a liquid crystal (LCD) display for blueprint reading or real time video feeds from mission control or from another astronaut. It has the added side benefit of extending battery life for powering the backlight when used during periods of darkness, which demands far lower lighting requirements.

In the embodiment of FIG. 10, the screen enclosure 12 can optionally be pressurized or can be vented to the ambient space environment. The heater thermostat assembly 48 is connected to a liquid crystal display (LCD) heater 51. The LCD heater 51 will have less demand imposed upon it and battery life will be extended if the screen enclosure is pressurized. In the embodiment of FIG. 9, the heater 51 may not be required because the viewing assembly is inside the pressure protective shell 42 and the insulating and equalizing properties of the breathing gasses tend to insulate the interior of the screen enclosure from temperature extremes caused by shadows and bright sunlight in space.

The temperatures in outer space are extreme, and some flat panel display screens, such as the Sharp LQ6NC01 color display screen have a limited temperature range in which they have an acceptable response time to changes in the video signal and picture clarity. For this type of screen, the LCD heater and optional temperature controlling thermostat can be used. The power requirements for the heaters vary from 1 to 2 watts per square inch and power requirements for the heaters can be determined as a function of heater resistance and supply voltage ($W=E^2/R$). The LCD heaters 51 are made of transparent mylar, glass and polycarbonate, with fine wires impregnated in them, which have a predetermined resistance to give off a certain amount of heat.

The LCD heaters 51 are attached to the display screen 14 in front of the electroluminescent backlight or fiber optic bundle whichever is used for backlighting by a suitable pressure sensitive adhesive or bonding agent to secure the heater to the display. If the display screen 14 is backlit with a flourescent tube, a flourescent tube heater may be used in extremely low temperature applications. The LCD screen heaters 50 may also be outfitted with temperature sensing elements for rapidly changing temperature differentials and controlled by temperature controllers. The LCD heaters, flourescent tube heaters, temperature sensors, temperature controllers, and fiber optic backlighting are commercially available and thus are not shown in detail.

If the screen assembly is exposed to shadows for extended periods of time, depending upon the screen's thermal responsiveness, a screen heater may be required even if the screen is enclosed in a pressurized environment due to the low insulating qualities of the polycarbonate visor, unless sharing the breathing gasses with the astronaut.

In the embodiment of FIG. 9, the viewing assembly 40 is mounted on the interior surface of the inner shell 42. Thus, the viewing assembly 40 is enclosed in the breathing medium of the astronaut and thermal stability is achieved, and the LCD heater may be deleted from the viewing assembly.

Referring again to FIGS. 7 and 8, another modification of the viewing assembly is shown wherein a television camera 52 is mounted on the helmet 11. In the illustrated example, the helmet shown is a diver's helmet 11, however, it should be understood that any other type of helmet may be used, such as a space suit helmet, policemans helmet, or firefighters helmet, or self contained breathing apparatus (SCBA). The television camera 52 is attached to the helmet 11 by a hold down clamp 53 and fastened by a screw 54.

OPERATION

With the underwater embodiment, prior to beginning a dive, the diver, or other technician will install the viewing assembly on the helmet of the diver. An appropriate video signal is sent to the screen and the quality of transmission is verified. The screen assembly is now ready for use by the diver. While underwater during a dive, the diver can selectively flip the display screen up out of the way to be able to see through the face plate of the diving helmet or face mask. With the viewing screen assembly having a signal receiver, the diver may receive acoustic or electronic signals from an underwater transmitter via wireless transmission underwater. Typical tasks which may be undertaken using this embodiment are: inspections of structures such as ship hulls, bridges, dam, piers, oil platforms, etc., and construction activities related to these inspections underwater. In other tasks, such as laser imaging in very murky water, the preferred position of the viewing assembly would be in the down position.

In conjunction with sonar assisted searches or ultrasonic inspections, the screen can have a split screen image conveyed to the diver. These split screen images are images on the viewing screen assembly where half of the screen shows a televised real time image of the environment that the diver is working in. This image can be captured by the television camera mounted on the diver's helmet, or in any suitable location for the task at hand, or may be generated by a source topside, and transmitted to the diver. The other half of the split screen image can be an image generated by a sensor for an electronic imaging device or a transducer for a nondestructive testing apparatus. Alternatively, the split screen image may have one side, a televised image of the diver's project that is being worked on, viewed by the camera on the diver's helmet, and the other side of the screen have a televised image of another portion of the project, as seen from a camera mounted on a counterpart diver's helmet. Thus, both divers could be viewing a split screen image which would be useful for divers working together in construction or any type of complicated mechanical work underwater.

In adverse environments, such as outer space, the viewing assembly can be used by two or more astronauts working together on a project, such as the assembly of a space station. In situations where one or both astronauts are hidden from each other's view, the viewing assembly in conjunction with an on-board television camera connected to the astronauts' helmet or space suit can convey an image of the task being executed by each to the other. For example, a first astronaut equipped with a camera and a display unit may be able observe a second astronaut similarly equipped attempting to complete a task, such as aligning connections, bolt holes, manipulating long beams, etc., and can see what the second astronaut sees and can better assist in completing the task by moving the other end of the beam, etc., even though they may be separated by fairly large distances. The visual display may also be located on an excursion vehicle used by an astronaut in traveling between the shuttle and another destination or in maneuvering in extra vehicular activities for ready access to information when needed.

In other adverse environments, such as for firefighters in a burning building, the screen assembly has a valuable use as a communications device for two or more firefighters who are working in different areas of the building. As a safety measure, if one of the firefighters becomes injured or trapped, the other firefighter will be better able to respond to the emergency by having a clearer idea of what is wrong. A video transmitter may be set up at any location remote from the screen assembly on the helmet or can be located on the firefighter's suit or helmet. The video transmitter may also be connected to a television camera on the suit or helmet of another firefighter so that each firefighter see what the other is doing. The video transmitter may also be located at a control point to connect the firefighters directly to supervisory personnel via the video feed so that a fire chief can monitor the activities of several firefighters who are working their way through a burning building searching for trapped victims of the fire.

The present invention provides a solution to the long-felt need for visual communications for many types of industrial and adverse environment tasks. Astronauts, commercial divers, police, firefighters, customs agents, construction workers, coal miners, and a host of other industrial occupations will benefit from the increased imaging detail, convenience in operation, and versatility. It can be used by almost anyone who is trained in their area of specialization or discipline, with little or no training. Unlike previous systems which are limited in viewing display size and detail, the present system, provides superior clarity, accuracy in detail, and large image size. This advancement in the art allows the transmission of a great many more types of visual data than was previously thought of, such as reading blueprints, drawings, and/or text while in space or underwater or in a burning building.

While this invention has been described fully and completely with special emphasis upon a preferred embodiment, it should be understood that within the scope of the appended claims the invention may be practiced otherwise than as specifically described herein.

I claim:

1. A visual display screen apparatus for helmets or face masks of the type having a viewing area covered by a face plate comprising;

a sealed enclosure adapted to be movably mounted on a helmet or face mask adjacent the face plate and having a transparent portion, a solid-state flat panel display screen and associated circuitry contained within said sealed enclosure capable of displaying sharp clear detailed visual images and text on said screen as they appear as seen by the naked eye responsive to electronic signals selected from the group consisting of analog, digital, television, and laser imaging signals, and signal connection means connected with said solid-state flat panel display screen for connecting said screen to an electronic signal transmission source for enabling said screen to receive said electronic signals, said sealed enclosure being selectively movable between a viewing position adjacent the face plate in the wearer's field of vision such that said visual images and text are seen by the wearer through the face plate and said transparent portion of said enclosure and a position out of the wearer's field of vision to allow an unobstructed field of vision through the face plate.

2. The visual display screen apparatus according to claim 1 in which said solid-state flat panel display screen is a liquid crystal display screen adapted to produce visual images from electronic signals selected from the group consisting of analog, digital, television, and laser imaging signals.

3. The visual display screen apparatus according to claim 1 including releasable fastener means for releasably fastening said sealed enclosure in a position out of the wearer's field of vision to allow an unobstructed field of vision through the face plate.

4. The visual display screen apparatus according to claim 1 in which said sealed enclosure is removably mounted on the helmet or face mask and removable therefrom to be hand-held or placed in a convenient location for viewing.

5. The visual display screen apparatus according to claim 1 in which;

said sealed enclosure is mounted on a movable member which is adapted to be movably connected the helmet or face mask adjacent the face plate.

6. The visual display screen apparatus according to claim 1 in which;

said associated circuitry includes adjustable backlighting means for automatically adjusting the brightness of said solid-state flat panel display screen to compensate for the lighting conditions of the ambient environment.

7. The visual display screen apparatus according to claim 1 in which;

said signal connection means comprises a signal receiver connected with said solid-state flat panel display screen for receiving electronic signals selected from the group consisting of analog, digital, television, and laser imaging signals from a remote signal transmitter.

8. A helmet or face mask having a visual display screen comprising;

a helmet or face mask to be worn by a person which covers at least the eyes of the wearer and has a viewing area covered by a face plate, an enclosure mounted on said helmet or face mask adjacent the face plate and having a transparent portion, a solid-state flat panel display screen and associated circuitry contained within said enclosure capable of displaying sharp clear detailed visual images and text on said screen as they appear as seen by the naked eye responsive to electronic signals selected from the group consisting of analog, digital, television, and laser imaging signals, signal connection means connected with said solid-state flat panel display screen for connecting said screen to an electronic signal transmission source for enabling said screen to receive said electronic signals, and said visual images and text being seen by the wearer through said face plate and said transparent portion of said enclosure while allowing the wearer a substantially unobstructed field of vision through said face plate.

9. The helmet or face mask according to claim 8 in which
said enclosure is movably attached to said helmet or face mask and is selectively movable between a viewing position adjacent said face plate in the wearer's field of vision such that the images may be seen through the face plate and transparent portion of said enclosure and a position out of the wearer's field of vision to allow an unobstructed field of vision through the face plate.

10. The helmet or face mask according to claim 8 in which
said helmet or face mask has a movable member connected thereto adjacent the face plate, and
said enclosure is mounted on said movable member adjacent the face plate of the helmet or face mask.

11. The helmet or face mask according to claim 8 in which
said solid-state flat panel display screen is a liquid crystal display screen adapted to produce visual images from electronic signals selected from the group consisting of analog, digital, television, and laser imaging signals.

12. The helmet or face mask according to claim 8 in which
said enclosure is removably mounted on said helmet or face mask and removable therefrom to be hand-held or placed in a convenient location for viewing.

13. The helmet or face mask according to claim 8 including;
imaging means connected to said helmet or face mask for transmitting electronic signals selected from the group consisting of analog, digital, television, and laser imaging signals to a remote location, and
signal receiver means connected with said solid-state flat panel display screen for receiving electronic signals selected from the group consisting of analog, digital, television, and laser imaging signals from a remote signal transmitter.

14. The helmet or face mask according to claim 8 in which
said helmet or face mask is a diver's helmet or face mask for use underwater, and
said enclosure is a waterproof enclosure for enclosing and waterproofing said solid-state flat panel display screen.

15. The helmet or face mask according to claim 14 including;
imaging means connected to said helmet or face mask for transmitting electronic signals selected from the group consisting of analog, digital, television, and laser imaging signals to a remote location, and
signal receiver means connected with said solid-state flat panel display screen for receiving electronic signals selected from the group consisting of analog, digital, television, and laser imaging signals from a remote signal transmitter.

16. The helmet or face mask according to claim 8 in which
said face plate is a truncated spherical configuration having a transparent portion in the wearers field of vision, and
said enclosure is located on the interior of said face plate.

17. The helmet or face mask according to claim 8 in which
said face plate is a truncated spherical configuration having a transparent portion in the wearers field of vision, and
said enclosure is located on the exterior of said face plate.

18. The helmet or face mask according to claim 8 in which
said helmet or face mask comprises a helmet having an outer shell and an inner shell,
said inner shell being a truncated spherical configuration having a transparent front portion and fitted at its open end with a neck ring suitable for sealing connection with a pressurized space suit,
an outer visor pivotally connected to said helmet outer shell to pivot between a retracted raised position about the rear portion of said helmet between said inner and outer shells and a forward lowered position to cover the front transparent portion of said inner shell, and
said enclosure is mounted adjacent said inner shell in a position to give a substantially unobstructed field of vision to the wearer.

19. The helmet or face mask according to claim 18 in which
said enclosure is mounted on said inner shell in a position to give a substantially unobstructed field of vision to the wearer.

20. The helmet or face mask according to claim 18 in which
said enclosure is mounted on said outer visor in a position to give a substantially unobstructed field of vision to the wearer.

21. The helmet or face mask according to claim 18 in which
said helmet has an intermediate member disposed between said inner shell and said outer visor, and
said enclosure is mounted on said intermediate member in a position to give a substantially unobstructed field of vision to the wearer.

22. A visual information system for installation on helmets or face masks of the type which covers at least the eyes of a wearer and has a viewing area covered by a face plate, the system comprising:
a solid-state flat panel display screen and associated circuitry adapted to be connected to an electronic signal transmission source for receiving electronic signals selected from the group consisting of analog, digital, television, and laser imaging signals and capable of displaying the signals as sharp clear detailed visual images and text on said screen as they appear as seen by the naked eye;
signal connection means connected with said solid-state flat panel display screen for connecting said screen to an electronic signal transmission source for enabling said screen to receive said electronic signals;
an enclosure for enclosing said solid-state flat panel display screen and having a transparent portion; and
mounting means for mounting said enclosure to the helmet or face mask adjacent the wearer's field of vision; and
said visual images and text being seen by the wearer through said transparent portion of said enclosure while allowing the wearer a substantially unobstructed field of vision through the face plate.

23. A visual information system for installation on helmets or face masks comprising:

a solid-state flat panel display screen and associated circuitry adapted to be connected to an electronic signal transmission source for receiving electronic signals selected from the group consisting of analog, digital, television, and laser imaging signals and capable of displaying the signals as sharp clear detailed visual images and text on said screen as they appear as seen by the naked eye;

signal connection means connected with said solid-state flat panel display screen for connecting said screen to an electronic signal transmission source for enabling said screen to receive said electronic signals;

an enclosure for enclosing said solid-state flat panel display screen;

mounting means for mounting said enclosure to a helmet or mask worn by a person adjacent the wearer's field of vision; and said enclosure being selectively movable between a viewing position adjacent the wearer's field of vision and a position out of the wearer's field of vision to allow an unobstructed field of vision;

whereby the wearer may view sharp clear detailed visual images or text transmitted from a remote source while engaged in various activities.

24. The visual information system according to claim 23 wherein
the helmet or face mask has a transparent face plate covering the wearer's field of vision, and
said enclosure is located on the interior of the face plate.

25. The visual information system according to claim 23 wherein
the helmet or face mask has a transparent face plate covering the wearer's field of vision, and
said enclosure is located on the exterior of the face plate.

26. The visual information system according to claim 23 including;
imaging means adapted to be connected to the helmet or face mask for transmitting electronic signals selected from the group consisting of analog, digital, television, and laser imaging signals to a remote location, and
signal receiver means connected with said solid-state flat panel display screen for receiving electronic signals selected from the group consisting of analog, digital, television, and laser imaging signals from a remote signal transmitter.

27. The visual information system according to claim 23 wherein
said solid-state flat panel display screen is a solid-state liquid crystal display screen adapted to produce visual images from electronic signals selected from the group consisting of analog, digital, television, and laser imaging signals.

28. The visual information system according to claim 23 wherein;
said associated circuitry includes adjustable backlighting means for automatically adjusting the brightness of said solid-state flat panel display screen to compensate for the lighting conditions of the ambient environment.

29. An underwater visual information system for installation on helmets or face masks comprising:

a solid-state flat panel display screen and associated circuitry adapted to be connected to an electronic signal transmission source for receiving electronic signals selected from the group consisting of analog, digital, television, and laser imaging signals and capable of displaying the signals as sharp clear detailed visual images and text on said screen as they appear as seen by the naked eye;

signal connection means connected with said solid-state flat panel display screen for connecting said screen to an electronic signal transmission source for enabling said screen to receive said electronic signals;

a waterproof enclosure for enclosing and waterproofing said solid-state flat panel display screen; and attachment means for movably attaching said enclosure to a diver's helmet or mask adjacent the face plate of the helmet or mask in the diver's field of vision;

whereby a diver may view sharp clear detailed visual images and text transmitted from a remote source while submerged in a fluid medium, and said solid-state flat panel display screen is selectively movable from the diver's field of vision by the diver during the course of a dive.

30. The underwater visual information system according to claim 29 including;
imaging means adapted to be connected to said helmet or face mask for transmitting electronic signals selected from the group consisting of analog, digital, television, and laser imaging signals to a remote location, and
signal receiver means connected with said solid-state flat panel display screen for receiving electronic signals selected from the group consisting of analog, digital, television, and laser imaging signals from a remote signal transmitter.

* * * * *